US006907226B2

(12) United States Patent
Kang et al.

(10) Patent No.: US 6,907,226 B2
(45) Date of Patent: Jun. 14, 2005

(54) WIRELESS COMMUNICATION APPARATUS, WIRELESS COMMUNICATION METHOD THEREOF, AND WIRELESS COMMUNICATION SYSTEM EMPLOYING THE SAME

(75) Inventors: Hyun-sook Kang, Kyungki-do (KR);
Tae-jin Lee, Kyungki-do (KR);
Jong-hun Park, Kyungki-do (KR);
Kyung-hun Jang, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 460 days.

(21) Appl. No.: 10/036,360

(22) Filed: Jan. 7, 2002

(65) Prior Publication Data

US 2002/0090914 A1 Jul. 11, 2002

(30) Foreign Application Priority Data

Jan. 5, 2001 (KR) ............................................ 2001-581

(51) Int. Cl.[7] ................................................ H04B 7/00
(52) U.S. Cl. ........................ 455/41.2; 455/557; 455/88; 455/11.1; 455/16; 455/63.3; 710/8; 710/10; 370/255; 370/356; 370/449; 370/349; 375/132; 375/356; 340/870.13; 340/825.52; 327/202
(58) Field of Search ............................. 455/41.2, 11.1, 455/16, 63.3, 61; 710/8, 10, 110, 113; 370/255, 356, 449, 349; 375/132, 356

(56) References Cited

U.S. PATENT DOCUMENTS

| | | | |
|---|---|---|---|
| 6,275,500 B1 * | 8/2001 | Callaway et al. | 370/449 |
| 6,480,505 B1 * | 11/2002 | Johansson et al. | 370/449 |
| 6,519,460 B1 * | 2/2003 | Haartsen | 455/452.1 |
| 6,535,498 B1 * | 3/2003 | Larsson et al. | 370/338 |
| 6,570,857 B1 * | 5/2003 | Haartsen et al. | 370/312 |
| 6,690,657 B1 * | 2/2004 | Lau et al. | 370/315 |
| 6,718,395 B1 * | 4/2004 | Ziegler | 709/248 |
| 6,748,195 B1 * | 6/2004 | Phillips | 455/41.2 |
| 6,754,250 B2 * | 6/2004 | Haartsen | 375/132 |

FOREIGN PATENT DOCUMENTS

| | | |
|---|---|---|
| JP | 11-008585 | 1/1999 |
| WO | WO 01 03379 | 1/2001 |

OTHER PUBLICATIONS

Zhang W et al: "On Improving the Performance of Bluetooth Networks Through Dynamic Role Management" Internet Article, May, 2001, XP002198269 * paragraph '02.1!-paragraph '02.3! * * paragraph '03.1!-paragraph '3..3.1! *.
"Specification of Bluetooth System; Wireless connections made easy; Core; v1.0B" Bluetooth Specification Version, XX, XX Dec. 1, 1999, pp. 1, 95–126, XP002173220 * paragraph '10.9.2! ** paragraph '10.9.3! *.
Haarsten J: "Bluetooth—The Universal Radio Interface for AD HOC, Wireless Connectivity" On—Ericsson Review, Ericsson. Stockholm, SE, No. 3, 1998, pp. 110–117, XP000783249 ISSN: 0014–0171 * p. 114, right–hand column, line 31–p. 115, right–hand column, line 46 *.

* cited by examiner

Primary Examiner—Marceau Milord
(74) Attorney, Agent, or Firm—Sughrue Mion, PLLC

(57) ABSTRACT

A wireless communication apparatus, a wireless communication method thereof, and a wireless communication system employing the same. A master device of the wireless communication system requests one slave device of a network to perform a function of a master device for a predetermined time, and sends Piconet information about other slave devices of the network, while the one slave device receives the Piconet information from the master device and communicates with the other slave devices of the network for a predetermined time as a temporary master device. Accordingly, the one slave device becomes a dynamic master device and communicates with the other slave devices by using a frequency hopping sequence and a clock of a previous master device as they are, there is no need to transmit the frequency hopping sequence and the clock of the new master device to the slave devices, and accordingly, much time can be saved.

26 Claims, 5 Drawing Sheets

WIRELESS COMMUNICATION APPARATUS, WIRELESS COMMUNICATION METHOD THEREOF, AND WIRELESS COMMUNICATION SYSTEM EMPLOYING THE SAME

BACKGROUND OF THE INVENTION

1. Field of the Invention

The present invention relates to wireless communication, and more particularly to a wireless communication apparatus, a wireless communication method thereof, and a wireless communication system employing the same, for enabling peer-to-peer communication between slave devices through master-to-slave switching.

2. Description of the Related Art

FIG. 1 is a view showing the structure of a Piconet in a general Bluetooth communication system.

In a current Bluetooth system, one unit U10 operating as a master device, and a plurality of units U20, U30, and U40 operating as slave devices form a Piconet, as shown in FIG. 1. At most, seven slave devices can participate in one Piconet for one master device U10.

In the Piconet, channels are established between the master device U10 and the slave devices U20, U30 and U40, and data is transmitted in the form of a packet. FIG. 2(a) shows the general form of the transmitted packet, and FIG. 2(b) shows the header part of the packet of FIG. 2(a) in greater detail.

Master device U10 allocates an active member address (AM_ADDR) to the slave devices U20–U40 of the Piconet. The active member address AM_ADDR of the slave devices U20, U30 and U40 is written in the header part of the packet and transmitted.

In accordance with the current Bluetooth communications, a master-driven Time Division Duplex method is used. If the master device appoints a certain slave device and transmits data to the appointed slave device, then the slave device that received the data transmits the response data to the master device.

Accordingly, slave devices only transmit data to the master device, and are unable to transmit data to other slave devices of the Piconet.

If master-to-slave switching is performed between one slave device and the master device of the Piconet, the slave device becomes a new master device and can communicate with other slave devices.

In the current Bluetooth communication system, by employing master-to-slave switching, the information of the original master device is transmitted to a new master device, and the other slave devices of the Piconet communicate according to the clock of the new master device. This is done by changing transmitter and receiver timing according to the clock of the new master device.

Next, the master-to-slave switching in the current Bluetooth system will be described in greater detail with reference to the accompanying drawings.

FIG. 3 is a diagram illustrating a signal flow during the conventional master-to-slave switching in the Piconet of FIG. 1.

First, the first unit U10, i.e., the old master device, requests master-to-slave switching to the second unit U20, i.e., one of the slave devices of the Piconet, according to a hopping sequence thereof (step S302). If the second unit U20 agrees to be a new master device, the second unit U20 sends a response signal to the old master device U10 (step S304).

Hereinafter, the first unit U10 is defined as an old master device, and the second unit U20 as a new master device.

The new master device U20 sends the old master device U10 an indication of a difference in the starts of master-to-slave slots between the new master device U20 and the old master device U10 through a time alignment Link Manager Protocol (LMP) message (step S306). The LMP message allows the old master device U10 to become synchronized with the clock of the new master device U20.

Further, the new master device U20 sends a Frequency Hopping Sequence (FHS) packet containing a new active member address AM_ADDR to the old master device U10 (step S308). Then the old master device U10 sends a FHS packet response to the new master device U20 (step S310). Accordingly, the new master device U20 exchanges the data transmission timing, namely transmitter and receiver timing, with the old master device U10.

The new master device U20 also sends the other slave devices, i.e., the third unit U30 and the fourth unit U40, the same time alignment LMP message and FHS packet that are sent to the old master device U10.

More specifically, the new master device U20 transmits the time alignment LMP message and the FHS packet to the third unit U30 (steps S312, S314). Then the new master device U20 receives a FHS response packet from the third unit U30 (step S316).

Further, the new master device U20 transmits the time alignment LMP message and the FHS packet to the fourth unit U40 (steps S318, S320). Then, the new master device U20 receives the FHS response packet from the fourth unit U40 (step S322).

Through the switching processes S312–S322 in the Piconet, the slave devices such as the third and the fourth units U30 and U40 can send and receive data in accordance with the clock of the new master device U20, and receive the active member address AM_ADDR from the new master device U20.

After receipt of the FHS response, the new master device U20 switches timing, and sends a poll packet to the third and the fourth units U30 and U40 to confirm whether the respective slave devices are switched to the timing of the new master device U20 (steps S324, S326).

FIG. 4 is a view showing the structure of the Piconet of FIG. 1, after the conventional master-to-slave switching.

As shown in FIG. 4, the second unit U20 has taken the function of the master device, while other units U10, U30, and U40 operate as slave devices in the Piconet.

Since the second unit U20, which was a slave device in the Piconet of FIG. 1, has become a master device of the Piconet of FIG. 4, the second unit U20 now can communicate with the other slave devices U10, U30 and U40 (see FIG. 4).

According to the above-described master-to-slave switching method of the current Bluetooth communication system, since the slave devices of the Piconet have to be allocated with new active member addresses (AM_ADDR) from a new master device, and change transmitter and receiving timing according to the clock information of the new master device, the procedure is very complex and requires a considerable amount of processing time.

Accordingly, there has been an increasing demand for a new communication method that would enable peer-to-peer communication between the slave devices through more rapid master-to-slave switching.

SUMMARY OF THE INVENTION

The present invention has been made to overcome the above-mentioned problems of the related art, and accordingly, it is an object of the present invention to provide a wireless communication apparatus, a wireless communication method, and a wireless communication system employing the same, which enable peer-to-peer communication between slave devices in a manner such that a slave device of a general Piconet uses a Frequency Hopping Sequence of a master device of the Piconet as it is.

The above object is accomplished by providing a wireless communication apparatus connected with one or more slave devices in a network. The wireless communication apparatus retains information about the connected slave devices in accordance with the present invention. The apparatus includes a transceiving portion for receiving externally transmitted data, and transmitting a signal, and a controller for requesting through the transceiving portion a certain slave device of the connected slave devices to perform a function of a master device for a predetermined time, and transmitting Piconet information about the connected slave devices of the network.

Preferably, the controller exchanges data transmission timing with the certain slave device that is requested to perform the function of the master device.

The above object is also accomplished by a wireless communication apparatus connected with a master device in a network in accordance with the present invention, including a transceiving portion for receiving externally transmitted data, and transmitting a signal, and a controller for receiving a request from the master device that requests a certain slave device to perform a function of a master device for a predetermined time. The controller receives Piconet information about other slave devices in the network from the master device, and is used to communicate with the other slave devices in the network for a predetermined time as a temporary master device.

Preferably, the controller exchanges data transmission timing with the master device.

The above object is also accomplished by a wireless communication method of a wireless communication apparatus which is connected with one or more slave devices in a network, and includes information about the connected slave devices in accordance with the present invention. The method includes requesting a certain slave device of the connected slave devices to perform a function of a master device for a predetermined time, and sending Piconet information about other slave devices of the connected slave devices of the network to the certain slave device.

The above object is also accomplished by a wireless communication method of a wireless communication apparatus connected with a master device in a network in accordance with the present invention. The method including; (a) a previous slave device being requested by the master device to perform a function of a temporary master device for a predetermined time, (b) receiving Piconet information about slave devices connected in the network from the master device, and (c) communicating with the other slave devices of the network as the temporary master device for the predetermined time.

Preferably, the process of receiving Piconet information, mentioned above, includes exchanging data transmission timing with the master device, and the process of communicating with other slave devices includes updating, as the temporary master device, the Piconet information about the connected slave devices of the network, and sending the updated information to the master device after a predetermined time.

The objects of the present invention are also accomplished by a wireless communication system, including one or more slave devices connected to the wireless communication system, and a master device having information about the connected slave devices. The master device requests a certain slave device of the connected slave devices to perform a function of a temporary master device for a predetermined time, exchanges data transmission timing with the certain slave device, and sends Piconet information about other slave devices of the connected slave device. The slave device receives the Piconet information about the other slave devices from the master device, and communicates as the temporary master device with the other slave devices for the predetermined time.

BRIEF DESCRIPTION OF THE DRAWINGS

The above object and other features of the present invention will be clarified by the following description with the attached drawings, in which:

FIG. 2 is a view showing a packet transmitted in the Piconet, in which FIG. 2(a) shows the general form of the packet, and FIG. 2(b) shows a header of the packet in greater detail;

DETAILED DESCRIPTION OF THE PREFERRED EMBODIMENT

Hereinafter, a wireless communication apparatus, a wireless communication method thereof, and a wireless communication system employing the same according to a preferred embodiment of the present invention will be described in greater detail with reference to the appended drawings.

Figure 1:
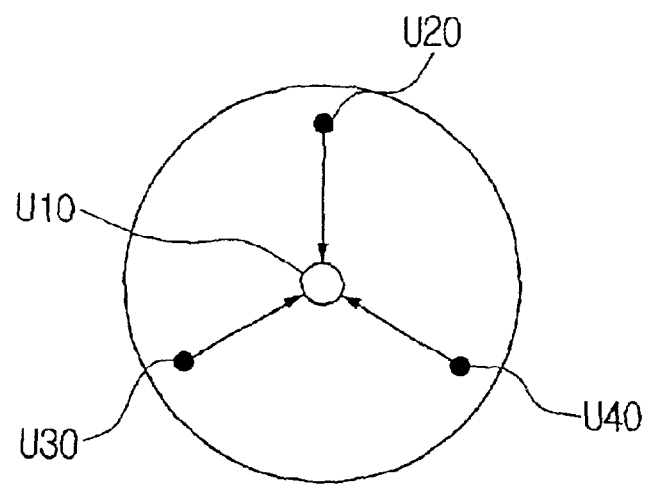
FIG. 1 is a view showing the structure of a Piconet of current Bluetooth communication system.
Figure 2:
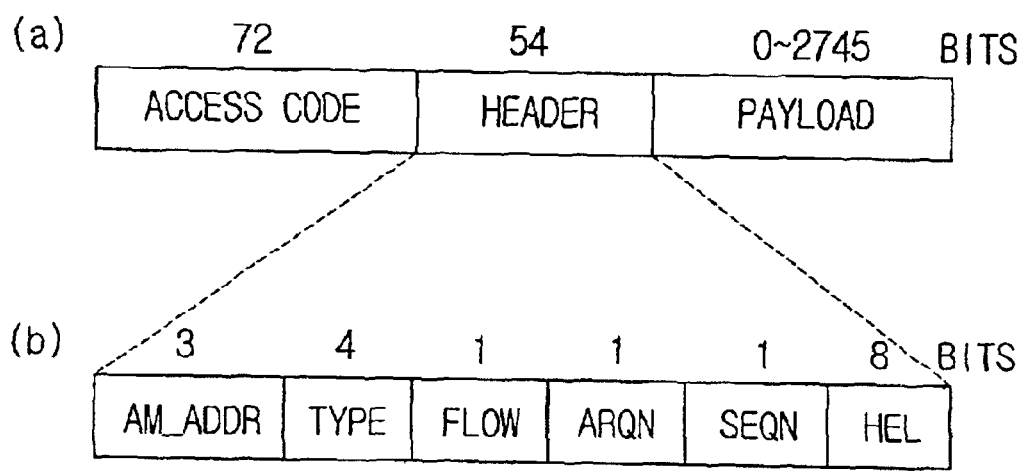
Figure 3:
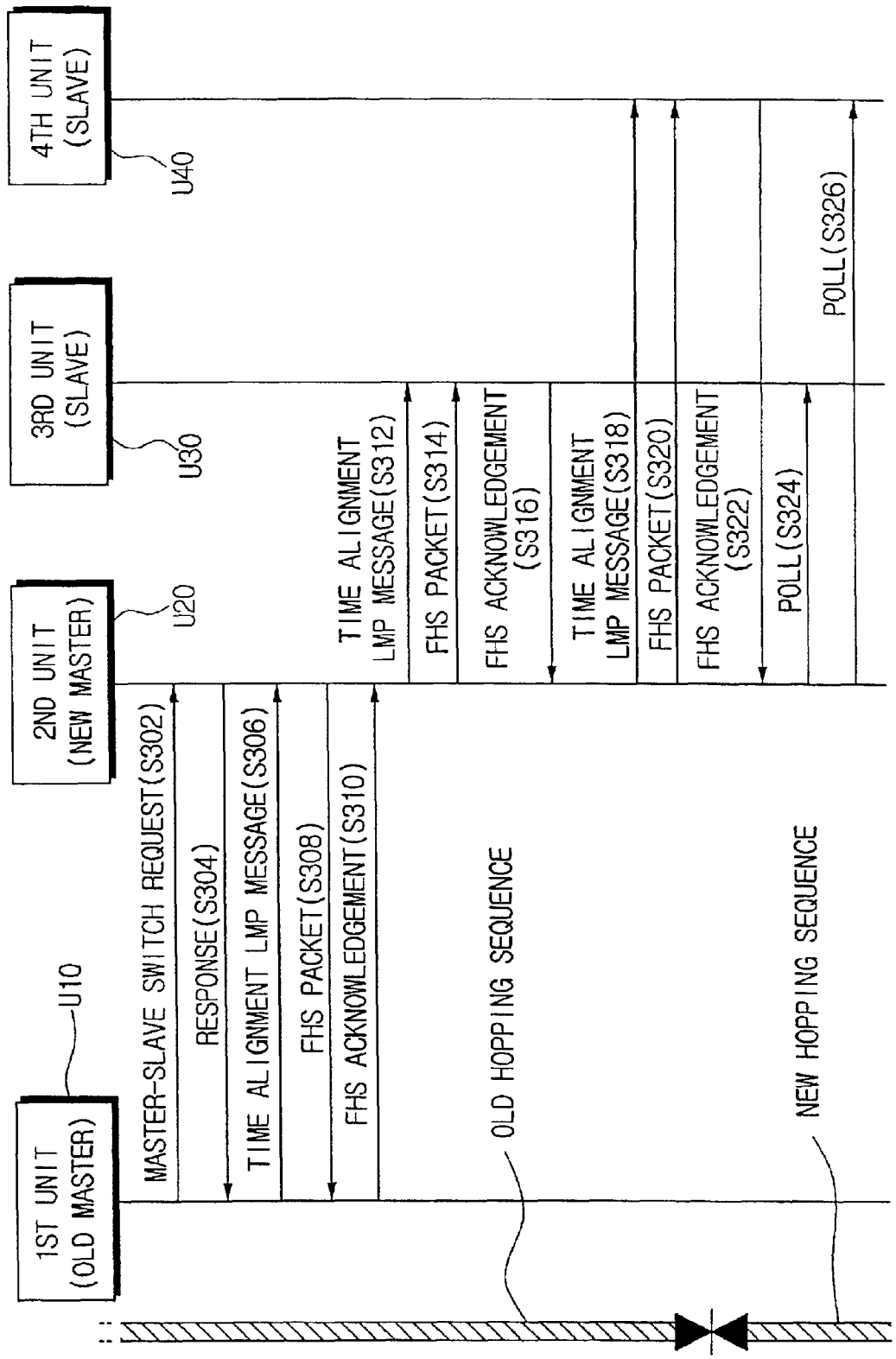
FIG. 3 is a diagram showing a flow of signal during the conventional master-to-slave switching in the Piconet of FIG. 1.
Figure 4:
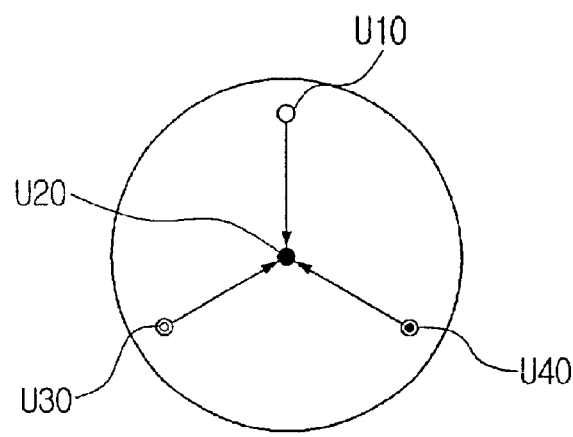
FIG. 4 is a view showing the structure of the Piconet after the conventional master-to-slave switching shown in FIG. 3.
Figure 5:
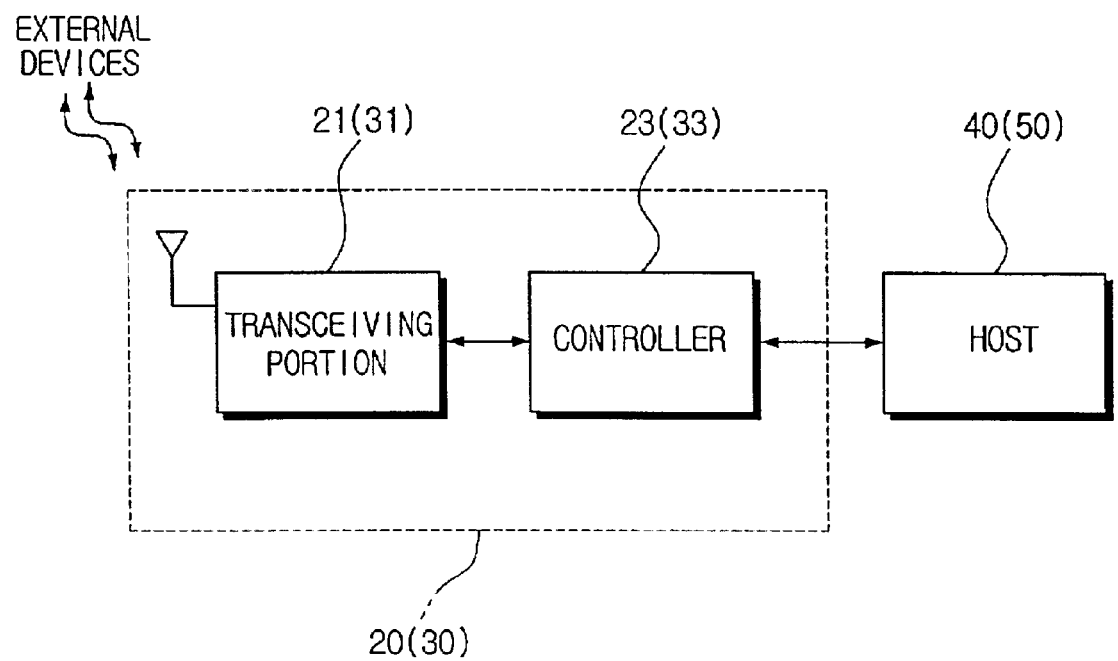
FIG. 5 is a block diagram showing a wireless communication apparatus according to the present invention.

FIG. 5 is a block diagram showing the wireless communication apparatus according to the present invention.

As shown in FIG. 5, the wireless communication apparatus 20(30) includes a transceiving portion 21(31), and a controller 23(33), wherein the reference numerals 20, 21, 23, and 40 refer to the wireless communication apparatus operating as a slave and its elements, while the reference numerals in parenthesis, i.e., 30, 31, 33 and 50 refer to the wireless communication apparatus operating as a master device and its elements.

First, the wireless communication apparatus 20 operating as a slave will be described below.

The transceiving portion 21 processes a signal received from the outside, such as a radio frequency (RF) signal, and sends out a transmission-intended packet.

The controller 23 is connected to a host 40 via a communication interface. The host can be various communication terminals, such as a laptop computer, mobile phone, and printer, or the like.

The controller processes the signal requested by the host 40, and also processes the signal received through the transceiving portion 21.

The wireless communication apparatus 20 operates as a slave device in a wireless network in which the wireless communication apparatus 20 is connected with other wireless communication apparatuses. Upon receipt of request from the master device through the transceiving portion 21 to operate as a master device for a predetermined time, the controller 23 of the wireless communication apparatus 20, operating as a slave device, exchanges data transmission timing with the wireless communication apparatus operating as a master device.

Further, the controller 23 of the wireless communication apparatus 20 receives Piconet information about the slave devices connected in the network, thereby enabling communication with other slave devices as a temporary master device for a predetermined time.

Next, the wireless communication apparatus 30 operating as a master device will be described.

The wireless communication apparatus 30 operating as a master device requests one of the slaves of the network to operate as a new master device for a predetermined time.

Accordingly, the controller 33 exchanges data transmission timing with the requested slave device, and sends the Piconet information including the active member addresses AM_ADDR of the slave devices connected in the network.

The master-to-slave switching between the wireless communication apparatuses 20 and 30 respectively operating as a slave device and a master device for performing a peer-to-peer communication, will be described below with reference to FIG. 6.

Figure 6:
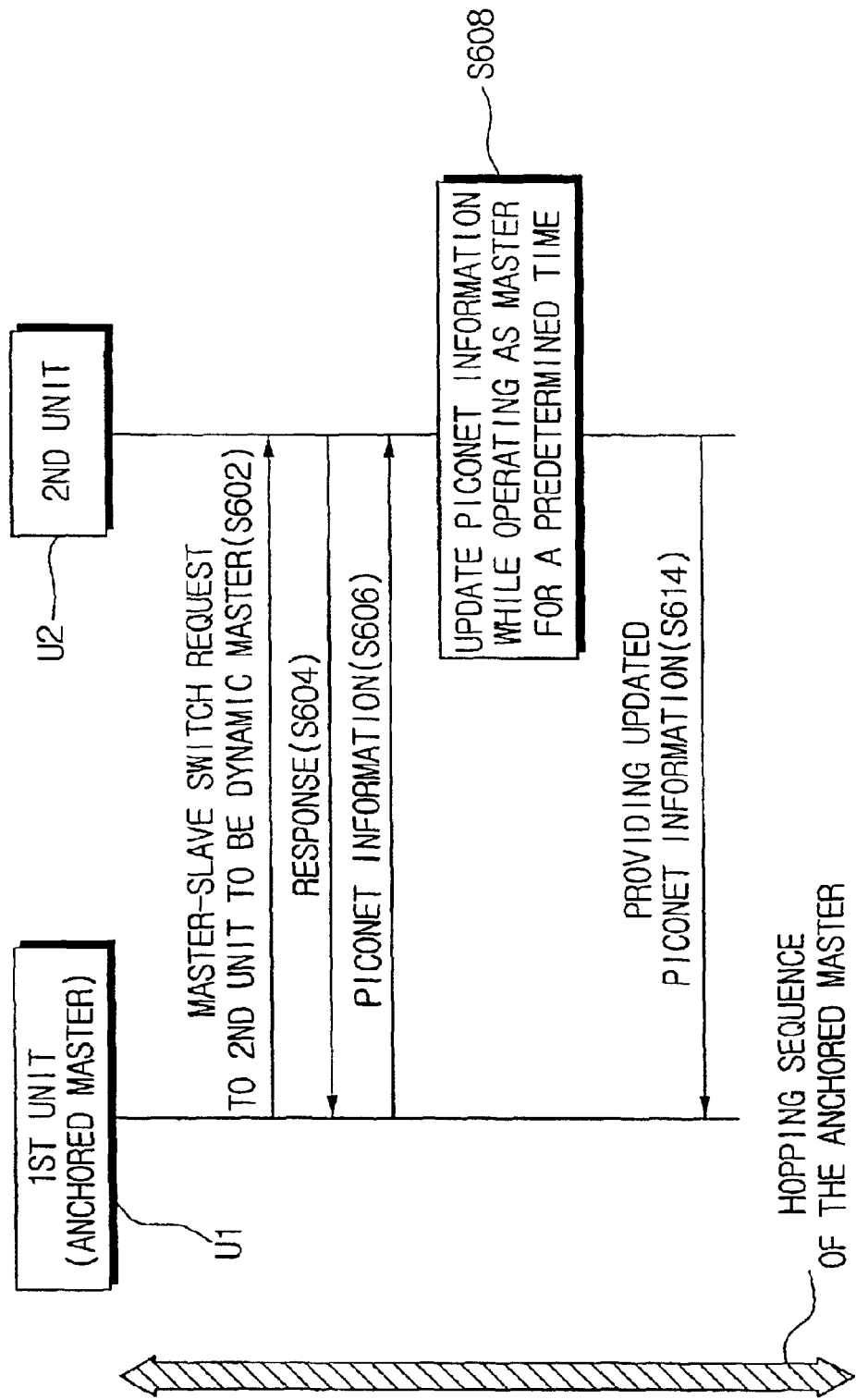
FIG. 6 is a view showing signal flow when a rapid master-to-slave switching is performed in the Piconet of FIG. 5 according to a preferred embodiment of the present invention.

Referring to FIG. 6, the original master device of the Piconet is defined as an anchored master device, while the unit temporarily operating as the master is defined as a dynamic master device.

The first unit U1 that is an anchored master requests a master-to-slave switching to the second unit U2 to be a dynamic master device intending to transfer its master function to the second unit U2 (step S602).

If the second unit U2 responds by agreeing with the master-slave-switching (step S604), receiver and transmitter timing exchange (i.e., TDD) is carried out between the anchored master device U1 and the second unit U2.

The anchored master device U1 transmits basic Piconet information such as the active member addresses AM_ADDR of the slave devices connected in the Piconet (step S606).

The second unit U2 performs the function of the master device for a predetermined time, communicating with other slave devices and updating the Piconet information of the slave devices (step S608). After the predetermined time, the second unit U2 transmits the updated Piconet information to the anchored master device (step S614).

As described above, the dynamic master device receives the function of the master device from the anchored master device. The dynamic master operates as the master device for a predetermined time, using the frequency hopping sequence and the clock of the anchored master device without alteration, which is based on the Bluetooth device address BD_ADDR of the anchored master device.

Accordingly, unlike conventional master-to-slave switching, there is no need to transmit the FHS packet containing Bluetooth device address (BD_ADDR) of the new master device to the slaves.

Figure 7:
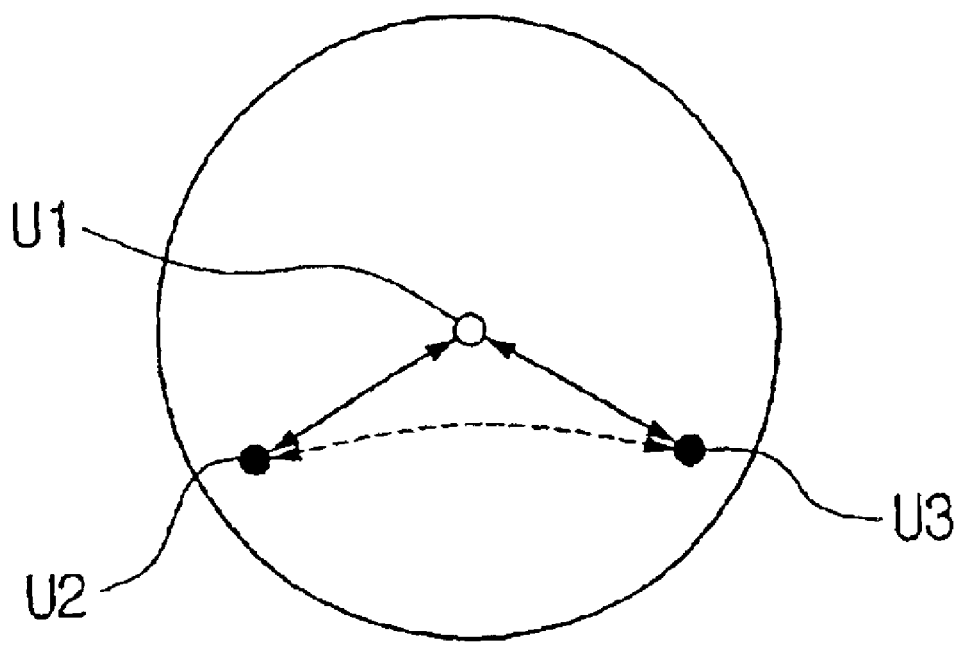
FIG. 7 is a view showing the structure of the Piconet after the rapid master-to-slave switching shown in FIG. 6.

FIG. 7 is a view showing the structure of the Piconet after the master-to-slave switching shown in FIG. 6.

The second unit U2, which becomes the dynamic master device, does not communicate via the first unit U1, which is the anchored unit (FIG. 7), but communicates directly with the third unit U3. Accordingly, the peer-to-peer communication between the second and the third units U2 and U3 becomes possible.

As described above, in the wireless communication apparatus, the wireless communication method thereof, and the wireless communication system employing the same according to the present invention, since the slave communicates with other slaves as the dynamic master device while using the frequency hopping sequence of the old master device, i.e., the anchored master device without change, the dynamic master device does not have to transmit its frequency hopping sequence and the clock to the slaves, and thus, much time can be saved.

Further, since the dynamic master device does not have to allocate new active member addresses AM_ADDR to the slaves, the master-to-slave switching can be carried out rapidly.

The present invention is not restricted to the foregoing embodiment thereof and changes can be made by those skilled in the art without departing from the scope of the invention. Therefore, the scope of the invention is defined by the following claims rather than the detailed description thereof.

What is claimed is:

1. A wireless communication apparatus connected with one or more slave devices in a network, the wireless communication apparatus having information about the connected slave devices, the apparatus comprising:

a transceiving portion for receiving externally transmitted data, and transmitting a signal; and a controller for requesting through the transceiving portion a certain slave device of the connected slave devices to perform a function of a master device for a predetermined time, and transmitting Piconet information about the connected slave devices of the network.

2. The wireless communication apparatus of claim 1, wherein the controller exchanges data transmission timing with the certain slave device that is requested to perform the function of the master device.

3. The wireless communication apparatus of claim 1, wherein the controller is connected to a host via a communication interface.

4. The wireless communication apparatus of claim 1, wherein the Piconet information includes an active member address allocated to the connected slave devices in an active mode of the network.

5. A wireless communication apparatus of claim 1, wherein the controller processes the signal requested by a host; and processes the signal received through the transceiving portion.

6. A wireless communication apparatus of claim 1, wherein the transceiving portion processes a signal from the outside and then sends out a transmission-intended packet.

7. A wireless communication apparatus connected with a master device in a network including the master device and slave devices, comprising:

a transceiving portion for receiving externally transmitted data, and transmitting a signal; and a controller for receiving a request from the master device that requests a certain slave device to perform a function of the master device for a predetermined time.

8. The wireless communication apparatus of claim 7, wherein the controller is operable to receive Piconet information about other slave devices in the network from the master device; and is operable to communicate with the other slave devices in the network for the predetermined time as a temporary master device.

9. The wireless communication apparatus of claim 7, wherein the controller exchanges data transmission timing with the master device.

10. The wireless communication apparatus of claim 7, wherein the controller enables the certain slave device operating as the temporary master device to communicate with the slave devices, other than the certain slave device, according to a frequency hopping sequence and a clock of the master device.

11. The wireless communication apparatus of claim 7, wherein the Piconet information includes an active member address allocated to the slave devices, other than the certain slave device, in an active mode of the network.

12. The wireless communication apparatus of claim 7, wherein the controller updates the Piconet information about the slave devices, other than the certain slave device, while the certain slave device performs the function of the temporary master device, and sends the updated information to the master device after the predetermined time.

13. A wireless communication method of a wireless communication apparatus which is connected with one or more slave devices in a network, and includes information about the connected slave devices, the wireless communication method comprising the steps of:

requesting a certain slave device of the connected slave devices to perform a function of a master device for a predetermined time; and sending Piconet information about other slave devices of the connected slave devices of the network to the certain slave device.

14. The wireless communication method of claim 13, further comprising exchanging data transmission timing with the certain slave device requested to perform the function of the master device.

15. The wireless communication method of claim 13, wherein the Piconet information contains an active member address allocated to the other slave devices in an active mode of the network.

16. The wireless communication method of claim 13, wherein the certain slave device receives the Piconet information about the other slave devices from the master device, and communicates as a temporary master device with the other slave devices for the predetermined time.

17. A wireless communication method of a wireless communication apparatus connected with a master device in a network, comprising the steps of:

(a) requesting that a slave device perform a function of a temporary master device for a predetermined time;

(b) receiving Piconet information, from the master device, about other connected slave devices in the network; and (c) communicating with the other slave devices of the network as the temporary master device for the predetermined time.

18. The wireless communication method of claim 17, wherein step (b) comprises the step of exchanging data transmission timing with the master device.

19. The wireless communication method of claim 17, wherein the Piconet information includes an active member address allocated to the connected slave devices in an active mode of the network.

20. The wireless communication method of claim 17, wherein a slave device performing the function of the temporary master device communicates with the other slave devices according to a frequency hopping sequence and a clock of the master device.

21. The wireless communication method of claim 17, wherein step (c) comprises the step of updating, as the temporary master device, the Piconet information about the other connected slave devices of the network, and sending the updated information to the master device after the predetermined time.

22. A wireless communication system comprising:

one or more slave devices connected to the wireless communication system; and a master device having information about the connected slave devices wherein the master device requests a certain slave device of the connected slave devices to perform a function of a temporary master device for a predetermined time, exchanges data transmission timing with the certain slave device, and sends Piconet information about other slave devices of the connected slave device, and the certain slave device receives the Piconet information about the other slave devices from the master device, and communicates as the temporary master device with the other slave devices for the predetermined time.

23. A wireless communication system comprising one or more piconets, wherein at least one of the piconets comprises:

an anchored master device operably connected to one or more slave devices, wherein each of the slave devices is operable to communicate only with said anchored master device and said anchored master device is operable to communicate with all of the slave devices;

a dynamic master device selected from one of the slave devices, wherein said anchored master device provides necessary information to said dynamic master device to enable said dynamic master device to communicate with all other slave devices for a predetermined amount of time.

24. A wireless communication system as claimed in claim 23, wherein said anchored master device comprises a controller that exchanges data transmission timing with said dynamic master device.

25. A wireless communication system as claimed in claim 24, wherein, the controller is connected to a host via a communication interface.

26. A wireless communication system as claimed in claim 24, wherein said anchored master device transmits Piconet information to said dynamic master device and wherein further, the Piconet information includes an active member address allocated to the slave devices in an active mode of a network.

* * * * *